United States Patent [19]

Greenbaum

[11] Patent Number: 4,622,950
[45] Date of Patent: Nov. 18, 1986

[54] SOLAMAR II

[76] Inventor: George Greenbaum, 6770 E. Carondelet Dr. #118, Tucson, Ariz. 85710

[21] Appl. No.: 696,164

[22] Filed: Jan. 29, 1985

[51] Int. Cl.[4] .............................................. F24C 3/00
[52] U.S. Cl. ................... 126/428; 126/429; 126/450; 47/17; 52/63
[58] Field of Search .............................. 126/428–432, 126/417, 434, 450; 47/17; 52/63

[56] References Cited

U.S. PATENT DOCUMENTS

| | | | |
|---|---|---|---|
| 2,840,400 | 6/1958 | D'Azzo | 52/63 |
| 3,718,533 | 2/1973 | Shibata | 47/17 |
| 4,269,170 | 5/1981 | Guerra | 126/430 |
| 4,313,420 | 2/1982 | Poeschl | 126/428 |
| 4,320,744 | 3/1982 | Fodor et al. | 126/428 |
| 4,446,850 | 5/1984 | Zilisch | 126/429 |
| 4,498,459 | 2/1985 | Korin et al. | 126/430 |
| 4,523,577 | 6/1985 | McClelland | 126/430 |

Primary Examiner—James C. Yeung
Attorney, Agent, or Firm—Thompson, Guthier, Samuels Stevens & Kehoe

[57] ABSTRACT

A shelter for the growth of plants and the like is provided which shelter is comprised of panels. The panels are formed of films which are adapted to control the transmission of energy into the shelter and further adapted to control the flow of fluids stream into and out of the shelter.

22 Claims, 14 Drawing Figures

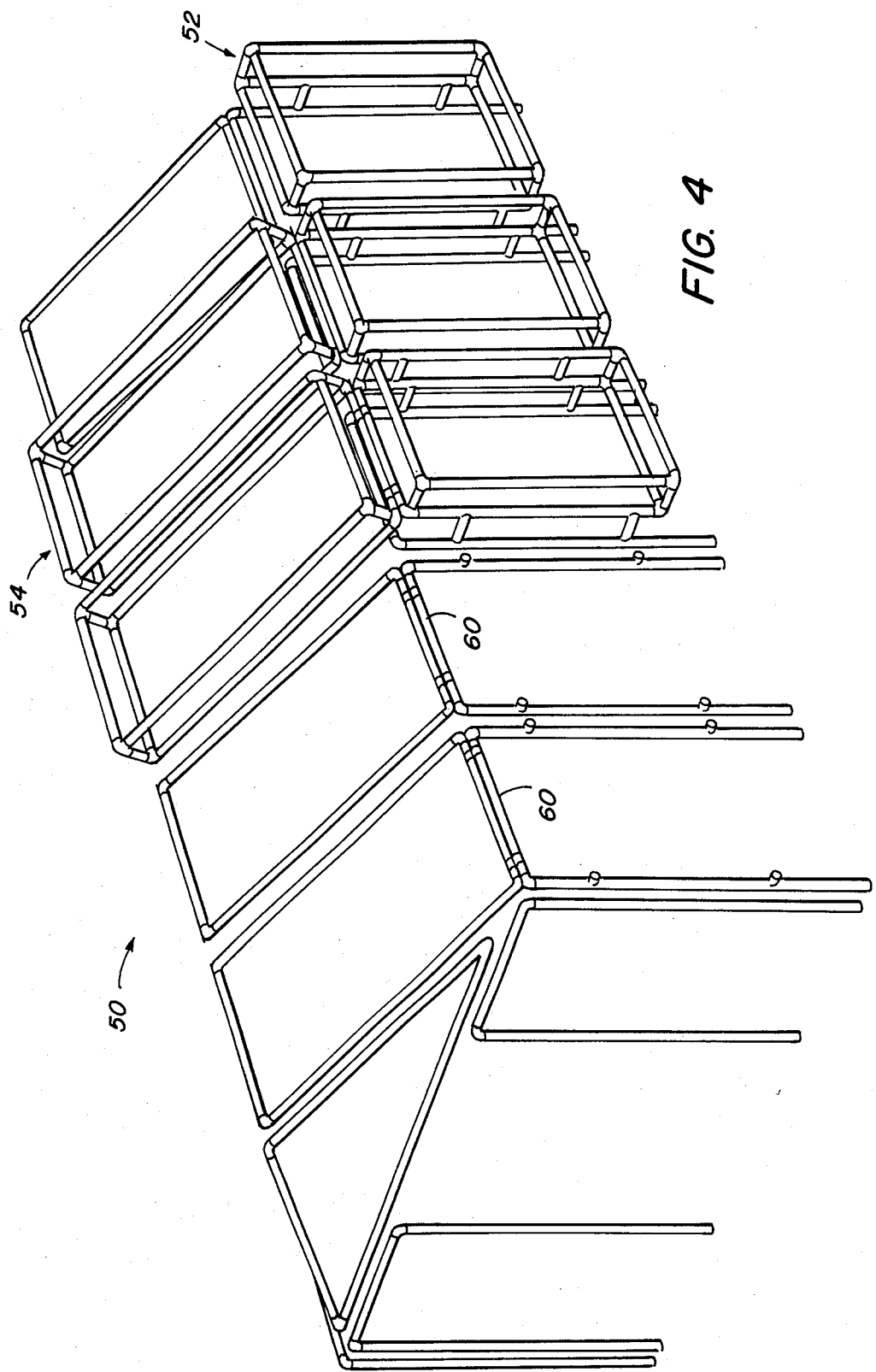

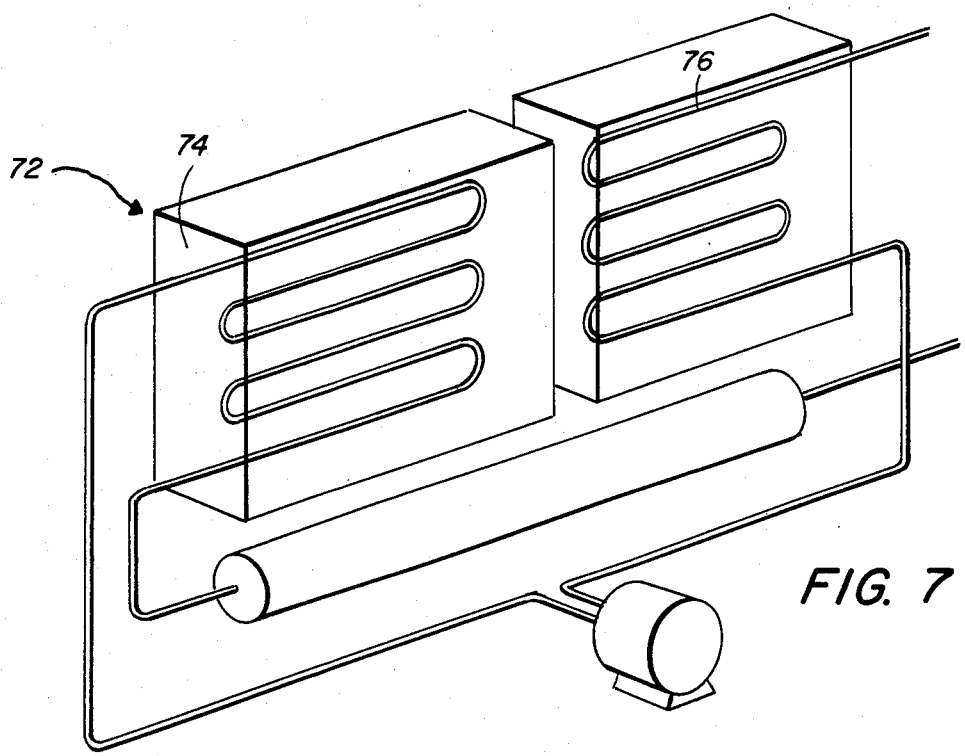
FIG. 7
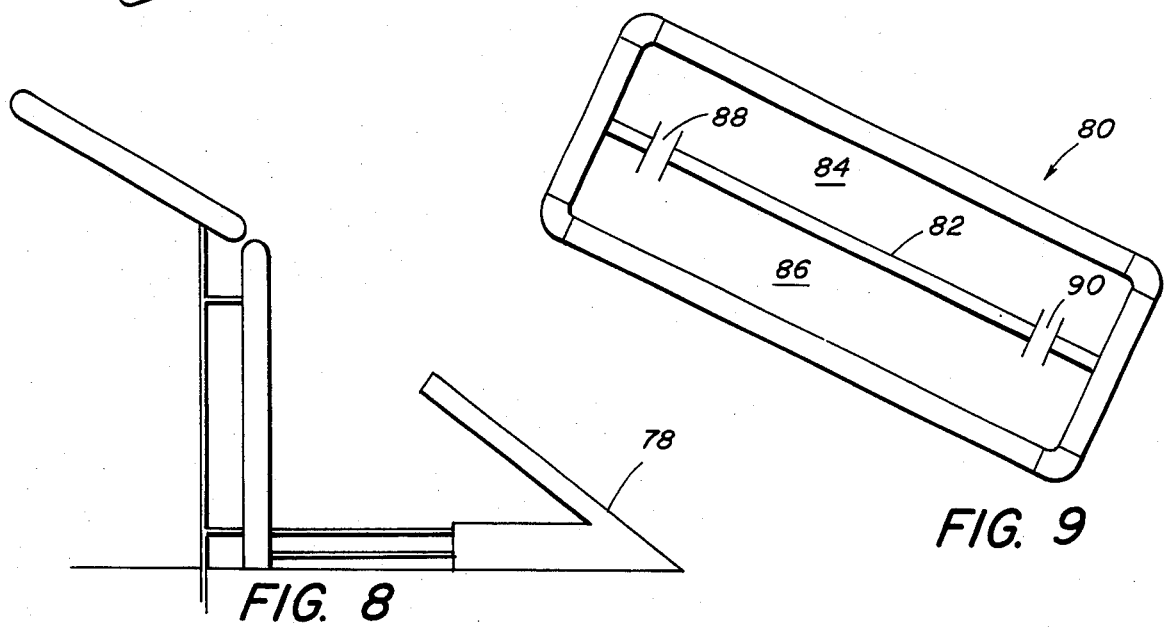
FIG. 8
FIG. 9
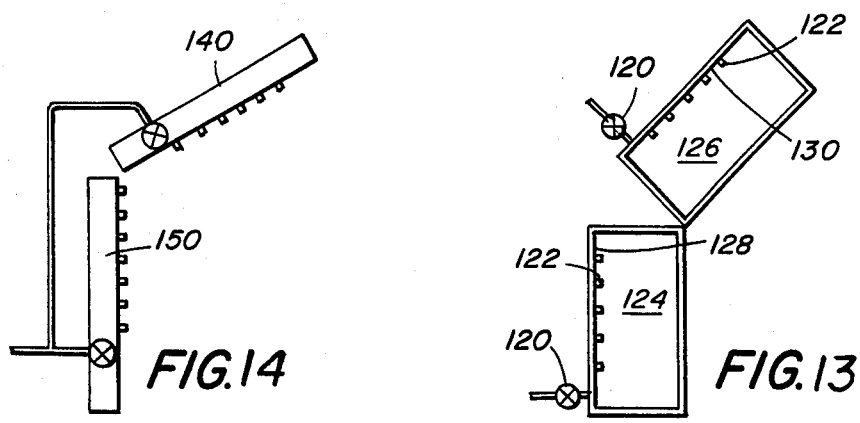
FIG. 14
FIG. 13

SOLAMAR II

BACKGROUND AND BRIEF SUMMARY OF THE INVENTION

This invention relates to composite solamar shelters and more particularly to structures which are readily adaptable in size and configuration to define an environment preferably about plants to control the amount of radiation, humidity, temperature and ventilation within the enclosed structure. Several types of structures have been disclosed which in one form or another, enclose plants. See for example U.S. Pat. No. 3,896,586—A Cover to Protect a Plant During Growth; U.S. Pat. No. 4,034,508—A Rigid Plastic Enclosure; U.S. Pat. Nos. 3,872,621 and 4,135,331—Seedling Enclosures; U.S. Pat. Nos. 4,148,154 and 4,412,325—Integral Rigid Enclosures; and U.S. Pat. No. 4,012,867—An Enclosure Including a Canister of Carbon Dioxide. All of these structures are rather limited in application primarily because of the fact that they are customized for a specific application and there is no flexibility inherent in their designs.

Broadly my invention comprises a plurality of wall and roof panels which are positioned in close contact with each other. These panels may be single-walled, double-walled, or variable double-walled. These panels may be joined directly one to the other, or may be secured to a skeletal tent-like framework.

The individual panels, when fabricated, include a frame formed of alluminum or steel rod, wooden rods, bamboo, galvanized pipe, etc., or preferably vinyl plastic pipe is used because of its cost, strength/weight ratio, worldwide availability and its facility in ease of cutting and forming. A film is wrapped about the frame to complete formation of the panel. The film is preferably wrapped in several layers. The film may be used alone or in combination with other films.

More particularly, polyethylene, fluorinated polyethylene such as DuPont's Tedlar, PVC, polyesters such as Mylar or polypropylene plastic films can be used as films. Further, these films may be transformed into cover membranes with greater utility by having them function as a carrier film wherein they may be metallized, colored, laminated, and coextruded to support a barrier film. As used in this disclosure, the term 'barrier film' means films such as disclosed in my copending applicatifon Ser. No. 501,603 and including films which will control the permeability characteristics of the carrier film. The films may or may not be treated with ultra-violet inhibitors to increase their solar resistance and their outdoor life. In one aspect radiation altering effects may be realized by spraying inner layers of the wrapped film with infrared or ultra violet absorbing or reflecting substances. Foils, such as aluminum, lead, etc., may function directly as the barrier film. That is, a film such as a polyethylene stretch wrap, etc. may be used as a standard covering, or as a carrier for more expensive, but, important barrier films with radiation-altering properties. In this aspect of the invention, a "sandwich" is created with a very cost effective control barrier. Because of the modular construction of my invention, the nature of the film material may be changed easily to accommodate new altered priorities. Additionally, by the interchangeability of the films in modular concept, selectively reflecting or absorbent films in the solar pathway may be used.

Accordingly, with the interleaving of specialized films to control the radiation and/or liquid and/or gas permeability and preferably with the use of ventilation ports, the climate within an enclosed structure may be ideally controlled.

In a preferred embodiment, each modular panel is comprised of rods joined together by suitable fittings such as T-joints, 45° angle joints, etcetera. The panels are joined to one another by connectors, such as pipe sections, which are secured in the fittings. Secured about the frame is film material such as STRETCH WRAP which is a clear, tough, resilient film. This film forms an outer skin and an inner skin and defines an insulation zone therebetween. Depending upon the ultimate use of the panels in a total composite structure one or more of the panels will have an outer vent secured to the outer skin and an inner vent secured to the inner skin to provide for the flow of ambient air through the insulation zone or a flow of air from the enclosed environment to ambient which flow of air is unimpeded.

My invention broadly embodies a shelter which comprises a plurality of wall panels arrayed in side-by-side relationship, each of said wall panels having upper ends and lower ends; a plurality of roof panels joined to the upper ends of the wall panels and to one another, the wall and roof panels defining an enclosed environment; at least one of said panels including a frame, a film secured about the frame to form an outer skin and an inner skin, which skins define an insulation zone therebetween; means to provide for the flow of air through the insulation zone of at least one of said panels; and at least one of said panels having a multilayer of film comprised of at least two distinct films, a first carrier film and a second barrier film, which barrier film may function as a filter in reference to the transmission of the spectrum of solar energy or control the flow of a gas or liquid through the skin or both.

BRIEF DESCRIPTION OF THE DRAWINGS

FIG. 4 is a perspective view of a total shelter structure embodying my invention;

FIG. 7 is a perspective view of double walled panels used for solar energy;

FIG. 8 is a schematic of a separate solar energy structure in communication with the vertical panels of the structure of FIG. 4;

FIG. 9 is a front view of a roof panel of my invention;

FIG. 13 is a side schematic of a further alternative embodiment of the panel of the invention; and FIG. 14 is a side schematic of an alternative embodiment of FIG. 13.

DESCRIPTION OF THE PREFERRED EMBODIMENT

Figure 1:
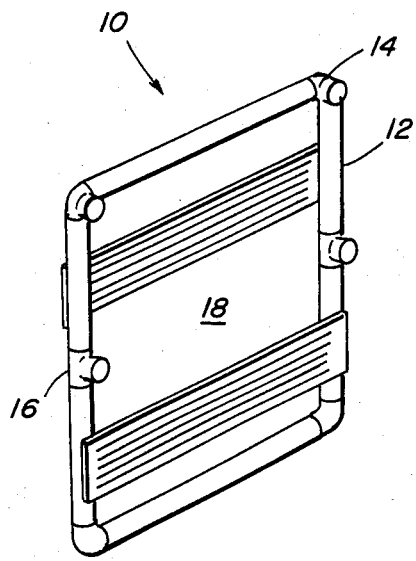
FIG. 1 is a perspective view of a panel embodying an aspect of my invention.
Figure 2:
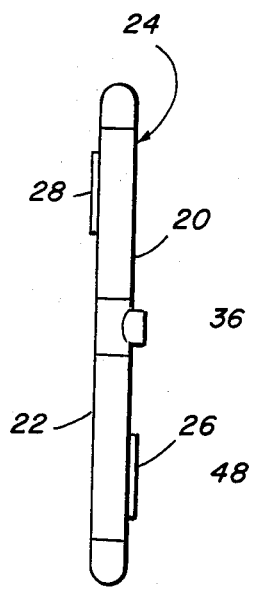
FIG. 2 is a side view of the panel of FIG. 1.

Referring to FIG. 1, a basic modular panel 10 is illustrated and comprises rods 12 joined by fittings 14 such as standard 90° elbow fittings and T-fittings 16. The three-way fittings, as will be described, are used to secure the panels. The rods as shown form a generally rectangular frame. Wrapped about the frame at least through one revolution but preferably several revolutions (layers) is a film 18 and in this embodiment the film is STRETCH WRAP. As shown more clearly in FIG. 2 the STRETCH WRAP forms an inner skin 20 and an outer skin 22 which skins define an insulation zone 24 therebetween. In this panel 10 there is an inner vent 26 secured to the inner skin and an outer vent 28 secured to the outer skin. This configuration as will be described allows for the flow of air into or out of a defined environment through an unobstructed flow path within the panel. The STRETCH WRAP 18 is typically wound in both the horizontal and vertical directions to ensure the insulation properties of the panel. The insulation zone is a natural thermal insulating barrier and acts as a conduit for the flow of air i.e. ventilation.

The vents may be of any desired configuration. A premolded rigid (plastic) panel which has suitably sized slotted openings may be clamped to the vertically extending rods as shown in FIG. 1. The frame then is wrapped front and back with the SHRINK WRAP. Where the film is coincident with the slotted openings it is removed. The cut edges may be taped or otherwise secured to the perimeter of the vents. In addition to slotted vents, screens, or any type of apertured structure may be used depending upon the fluid flow characteristics desired. Also, wherein film covers the openings of the fittings 14 and 16, it is removed and the film secured around the opening, such as by adhesives.

In lieu of STRETCH WRAP or the film such as regular polyethylene may be used, preferably in the form of gussetted tubing which would be slipped over the framework, its ends cut to the proper length and then both ends, each heat sealed, to form the closed unit.

Figure 3:
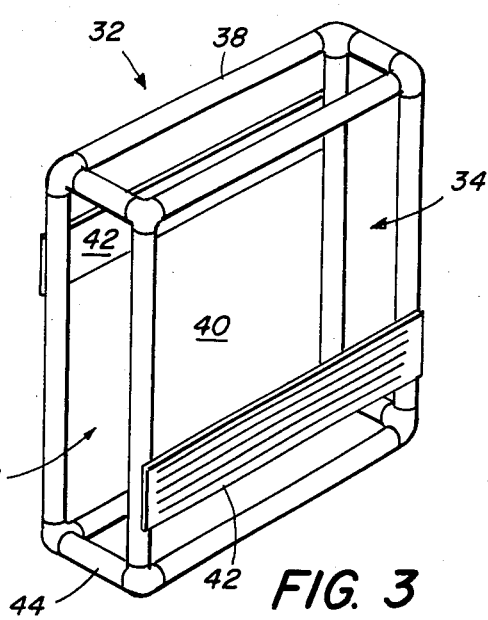
FIG. 3 is a perspective view of a multiple insulated panel.

An alternative embodiment of the panels of the invention is shown in FIG. 3 wherein a double walled panel assembly 32 is shown comprising panel a 34 and a panel 36 in spaced apart parallel relationship. Each of the panels 34 and 36 are formed of rods 38 and film 40 and each include a single vent 42 as described for FIGS. 1 and 2. Each of the panels are wrapped as described for FIGS. 1 and 2. The vents 42 are secured to the inner and outer skins of each panel. This allows for the flow of air through the vents of each of the panels 34 and 36 respectively. The panels of the assembly 32 are secured in spaced apart relationship by stiffeners 44 which are joined to the fittings on the corners of the panels 34 and 36. After the panels have been assembled, they define an insulation zone 48. The air flow is through one vent 42 into the zone 48 and out the other vent 42.

As will be apparent the panels may be of any particular geometric configuration and in the following description the panels will vary in geometric configuration depending upon whether they are used for wall panels or roof panels. The preferred stretch film used herein is a polyethylene or polyvinyl film available from the Mobil Corporation or Borden Company respectively. This STRETCH WRAP has the ability to form an extremely strong bond when properly applied. The first layer (revolution about the frame) is applied and subsequent layers are applied under substantial elastic tension. The terminus of the film may be adhesively sealed or heat sealed resulting in the film being secured to the frame under high compression. The application of the film is similar to applying an elastic bandage.

The essence of the basic invention is to provide a shelter around a growing plant thus creating an environment which can be controlled by man. I have accomplished this by developing a simple, low cost technique which permits a certain degree of manipulation with regard to temperature, light concentrations, water management, airborn insects and diseases, foliar fertilization, carbon dioxide enrichment, spray drift, soil crusting, acid rain and frost protection.

The film used in my invention can range from 0.5 to 20 mils in thickness may be flexible or semi-rigid and may be stretch film, polyethylene, polypropylene, polyvinyl, polyacrylate etcetera.

The ventilation ports both at ground surface and anywhere within the panels may also be screens, netting or burlap.

Referring to FIG. 4, a shelter 50 is shown and comprises wall panels 52, roof panels 54 and buttresses 60. The panels 52 and 54 are joined to one another and to the buttresses. The wall panels are also joined across the back of the structure (not shown) are sealed one to the other. A combination of single and double wall panels have been illustrated. Any combination may be used including all single walled, all double walled, combinations of vents-no vents for the structures described for FIGS. 6, 7, 9 and 10 etc.

Figure 5:
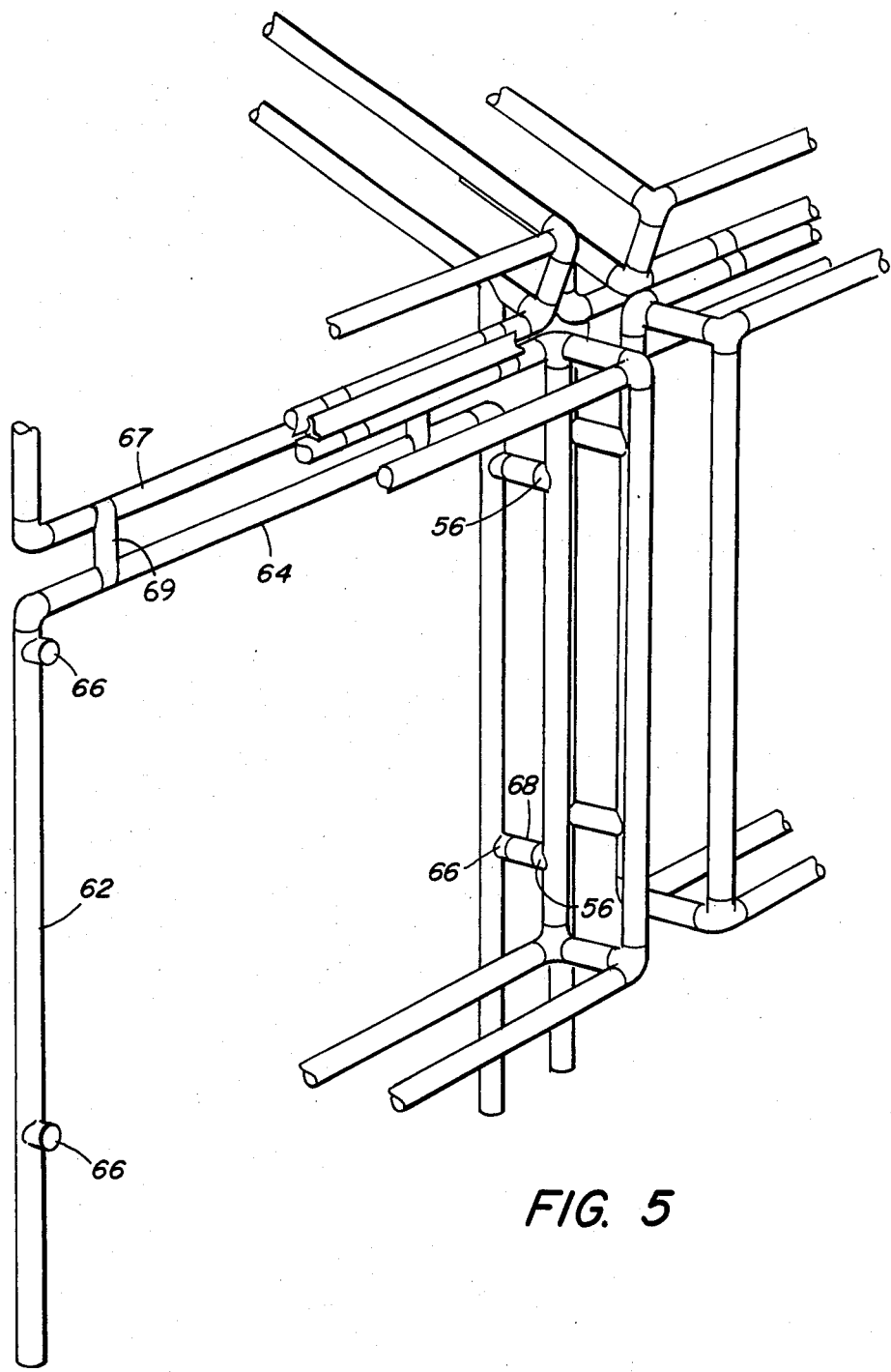
FIG. 5 is a perspective view of a section of FIG. 1 showing foam sealing strips between adjacent panels.
Figure 6:
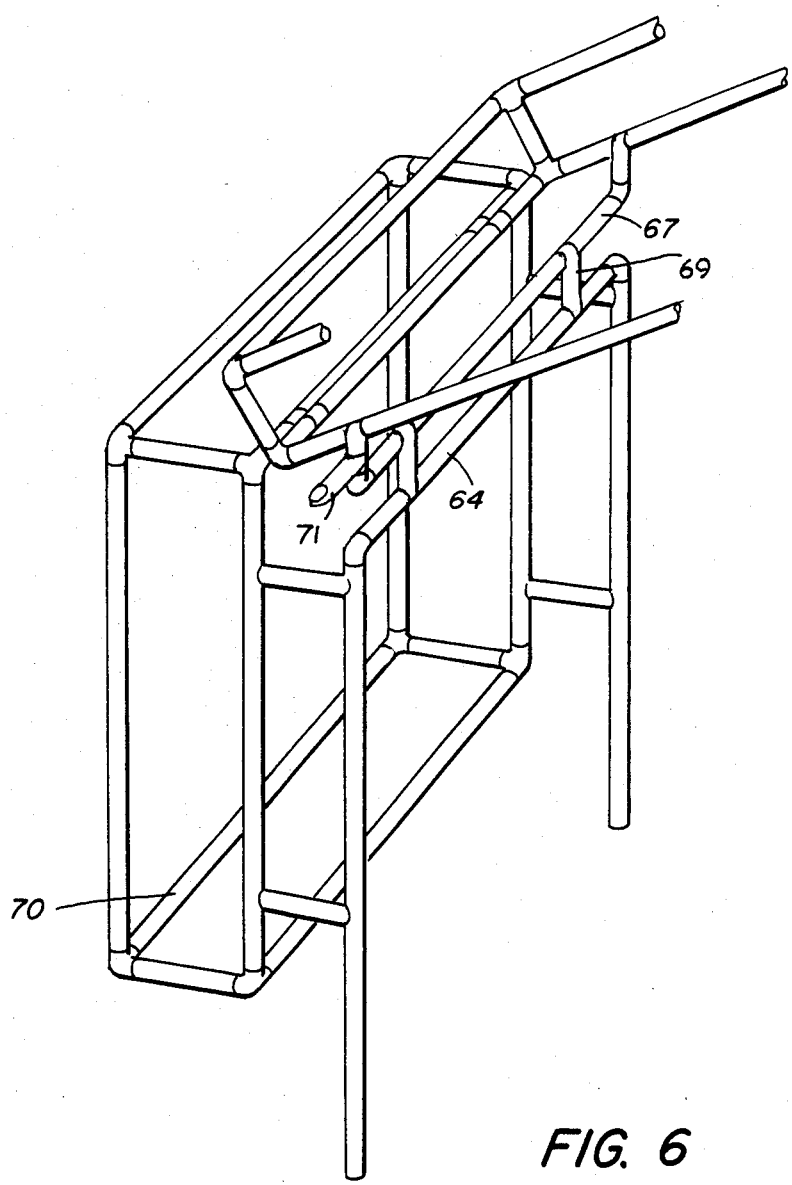
FIG. 6 is a perspective view of a double walled panel containing therein material to control the defined environment thermally and/or spectrally.

Referring to FIG. 5, the roof and wall panels have exposed fittings 56. These exposed fittings 56 are typically in place when the panel is constructed. The film is simply cut away around the fitting and then sealed to the periphery of the fitting. The buttress 60 comprises vertical members 62 and a horizontal member 64. The members 62 and 64 have exposed fittings 66. The wall panels 52 are joined by struts 68 to the buttress by securing the struts 68 to the fittings 56 and 66 as shown, to hold the walls in place. The roof panels with reference to the horizontal may be secured to the wall panels at any desired angle. Where the roof panels butt one another and the upper end of the wall panels they are joined by any suitable clamping arrangement. To control the angle of the roof panel an adjunct frame 67 is secured to the roof panel and to the horizontal member 64 of the buttress by any suitable connectors such as clamps 69. As shown in FIG. 6, horizontal members 71 can be used to join adjacent adjunct frames.

Buttresses may be used for each wall panel, may be used for alternate wall panels or may be used in various combinations depending upon the requirements of the particular structure to be assembled. The advantage of using the buttress combination as shown in FIGS. 4, 5 and 6 is to facilitate the sealing off of the environment defined by the shelter. More specifically, as shown in FIG. 5, at the interfaces between the edges of adjacent wall panels and adjacent roof panels, there are inserted strips of soft foam, preferably closed cell foam. Generally, these foam strips will be adhesively secured in place. Depending upon the amount of control over the environment defined by the shelter where the panels butt they may be caulked or sealed in any suitable manner. The front of the shelter may be draped with sheet material to allow access into and from the structure 50.

The external environment and type of plant or plants grown within the shelter will determine the amount of ventilation necessary and thus dictate the size of the vents for each of the panels and whether they be used solely for wall panels or roof panels or combinations of both. Further, it is conceivable that only one side of the structure may include the vents as shown in FIG. 3; that alternating panels may include such vents or that such vented panels may be used in any desirable combination.

A further aspect of my invention which significantly enhances the climatic control within the structure is shown in FIG. 6. Structurally FIG. 6 is similar to FIG. 5 except that the angular relationship of a roof panel with respect to a buttress is more clearly shown. The major distinction between a double panel of FIGS. 4 and 5 and that of FIG. 6 is the inclusion in the panel of FIG. 6 of a conditioning material. In FIG. 6 a material 70 is represented in the panel as being symbolic of the various types of materials that may be inserted. More specifically, the panel can be filled with a wide variety of materials that can transfer the structural configuration into a highly effective solar device. Zeolite crystals (natural and synthetic) can be used. The sun's rays cause the zeolites to release water vapor endothermically. As is well known, water vapor absorbs infrared radiation. In the evening the zeolites absorb the water vapor exothermically. Depending upon the ultimate use of such a panel(s) the relationship between radiation absorption for heating and zeolite efficiency for cooling during the day (and the reverse at night) the panels such as described could be assembled for any desired temperature modification. How the zeolite crystals are placed i.e. density and physical stability will depend upon the use of the panels; i.e. wall panel or roof panel.

Bulk materials 70 to absorb solar radiation during the day and slowly release it at night would include products such as soil, sand, gravel, rocks, ceramic and glass spheres and plastics, clear polystyrene or other synthetic plastic pellets. Typically, the panel would have a single vent which would communicate with the inside of the shelter. Additional materials which could be used include containers of water, ethylene glycol, carbon dioxide for absorption, carbon black and eutectic salt mixtures. In the case of roof panels, clear plastic pellets could be used in that they are ideal heat absorbers yet allow visible light to penetrate to the interior. Additionally, a liquid or solid adapted to undergo a phase change to a gas upon exposure to a change in temperature and/or light energy may be placed in the panel. For example, water placed in the panel will vaporize to a gas during the day which gas is effective as an absorbing medium for infrared radiation. In lieu of or in addition to such a layer of water a layer of hindered amines such as Tinuvin, Ciba-Geigy may be sprayed on and used for ultraviolet absorption.

In FIG. 7 double wall panels 72 are shown having heat absorbing material 74 therein such as ceramic balls, sand, gravel, etc. Serpentine pipes 76 are embedded in the material which pipes carry a heat exchange fluid such as water, salt water, Freon, ammonia, ethylene glycol, etc. This heat exchange fluid is stored and recycled in the evening to heat the shelter at night. The environment in which the shelter is disposed and the environment in which it is desired to maintain within the shelter, refrigerants, such as ammonia, Freon, etc. may be circulated through the pipes 76.

In FIG. 8 a structure such as shown in FIG. 4 is illustrated and includes a solar absorber 78. It may be advantageous to construct a shelter of the invention solely from single-walled or double-walled panels and to provide additional thermal energy (or a coolant) to the walls of the structure by providing the external solar absorber 78. In this way the shelter may be easily assembled without considerations to be given to the size, positioning and location of a solar absorber within the concept of the structure per se.

In FIG. 9 a double-walled roof panel 80 is shown which is characterized by an intermediate film 82 which separates the panel 80 into an upper zone 84 and a lower zone 86. The film 82 has upper vent 88 and a lower vent 90 therein. The lower zone contains water or other suitable material which upon heating will vaporize. The vapor passes through the upper vent 88 and into the upper zone 84. The vapor which migrates or diffuses to the lower end of the roof panel, as shown in drawing, where it encounters a cooler region condenses and flow through the lower vent and back into the lower zone.

Figure 10:
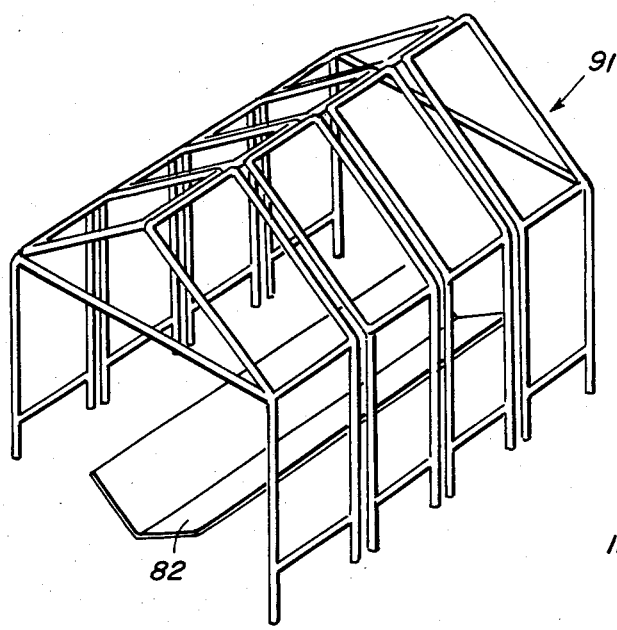
FIG. 10 is an alternative embodiment of a total structure of the invention.

The panels may be secured one to the other as shown in FIG. 4 or to a skeletal frame comprising vertical poles, pole plates, ridge poles and rafters. Single wall panels secured to such a frame 91 are shown in FIG. 10 to form a shelter. The structure of FIG. 10 includes reflective surfaces 82 therein to enhance the light available for plant growth.

In lieu of or in addition to the materials and structure described for FIG. 6, an important aspect of my invention includes modifying the characteristics of the radiant energy as it strikes and passes through the skin. Interleaved with the layers of film (carrier film) forming the skin are barrier films which may be films interleaved with the carrier film or films may be coated or sprayed on the carrier film.

Figure 11:
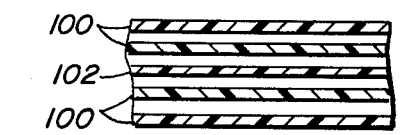
FIG. 11 is a sectional view of a multi layered skin which may be used for the panels.

For example, the skins of the panels of my invention may include metallized barrier film such as aluminum foil which has been interleaved in the formation of the skin carrier films shown more clearly in FIG. 11. The carrier film is shown as 100 and the metallized film as 102.

This interleaving of these films is described in detail in my copending application Ser. No. 501,603 filed June 6, 1983 which is hereby incorporated by reference in its entirety in this application. In the formation of these films as described in my aforementioned application, the STRETCH WRAP is wound spirally about the frame and a barrier film such as a metallized film is interleaved between adjacent layers of the STRETCH WRAP. The lateral edges of the metallized film may not be coextensive with the lateral edges of the panel.

The barrier films may be created by applying coatings such as polymeric systems to one or both surfaces of the carrier film and the resultant combination functions as a barrier film to control the radiation passing therethrough, such as to inhibit ultraviolet radiation. The systems may be sprayed, doctored or brushed on. The coatings may be bonded to the carrier film by the adhesive characteristics of the applied liquid film, by crosslinking, polymerization and/or irradiation.

Figure 12:
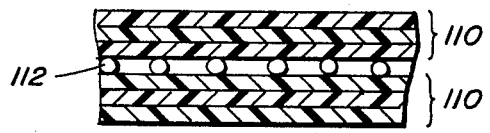
FIG. 12 is a front sectional view of an alternative embodiment of FIG. 11.

As shown in FIG. 12, carrier films 110 are spaced apart by cylindrical ribs 112 and water is shown schematically therebetween. In assembling such a panel, the water is sprayed on as a layer while wrapping. The ribs 112 allow the water space within which to vaporize when heated, enhancing the absorptive characteristics of the panel. The film is heat sealed about its lateral rectangular edges to retain the water vapor therein. In lieu of water, or in addition thereto, any liquid, either organic or inorganic, whether in the form of a solution, suspension, emulsion, etc. may be disposed between the ribs. The opposed surfaces of the spaced apart carrier film may be coated, such as with a polymer (barrier film), which will make the film impermeable to the liquid/vapor therebetween. Thus, any liquid/vapor/gas may be contained between said films.

In a still further embodiment of the invention, fluids may be transported through the hollow rods of the frame. The rods are apertured to allow the fluids to enter the panel or to be discharged into the defined environment, or both. As shown schematically in FIG. 13 valves 120 and nozzles 122 are joined to a wall panel 124 and a roof panel 126, respectively, to symbolize the introduction of fluids into rods 128 and 130, from which they are discharged into panel. FIG. 14 shows a roof panel 140 and a wall panel 150, with nozzles adapted to discharge fluids into the defined environment. Any type of nozzles, appertures, valving arrangements, etc. may be used and are well within the skill of the art and need not be described in detail.

The fluids to be introduced into the environment and/or panels will, of course, depend upon the total environment desired and affect temperature conditions, amount of expected sunlight, humidity, etc. For gases water vapor, carbon dioxide, halogenated gases like Freon are used, which gases preferrably absorb infrared radiation and thereby function as infrared reflecting mirrors to create a greenhouse effect. Liquids which may be used are those previously described for the sandwich arrangement of FIGS. 11 and 12. In this regard, still referring to FIGS. 11 and 12, the multi-layered concept is advantageously used to provide an impermeable panel (polyethylene normally being used to wrap the panels is porous) whereby the necessary gases may be introduced into and retained within the panel (simply by closing off the valves once the materials have been introduced) to render the skins of the panel impermeable to the gases.

The panel construction of my invention, whether the panels are joined at one to the other or to a skeletal framework, allows panels to be readily removed and replaced at will to achieve the desired characteristics, both in regard to the type of radiation entering the structure the temperature, humidity, and the amount of circulation within the structure.

Having described my invention what I now claim is:

1. A shelter which comprises:
   a plurality of wall panels arrayed in side-by-side relationship, ech of said wall panels having upper ends and lower ends;
   a plurality of roof panels joined to the upper ends of the wall panels and to one another, the wall and roof panels defining an enclosed environment;
   at least one of said panels comprising a frame, a film secured about the frame to form an outer skin and an inner skin which skins define an insulation zone therebetween; and
   one of said skins comprised of at least two distinct films a carrier film and a metallized barrier film, said barrier film supported by said carrier film and which barrier film functions as a filter in reference to the transmission of solar energy.

2. The shelter of claim 1 which comprises:
   means disposed in the insulation zone to control the climate therein.

3. The shelter of claim 2 wherein the means to control comprises zeolites.

4. The shelter of claim 2 wherein the means to control comprises a substance adapted to undergo a phase change upon exposure to solar energy whereby the absorption capabilities of the panel are enhanced.

5. The shelter of claim 1 wherein said means to control includes:
   means to absorb solar energy and to retain said solar energy whereby the panel functions as a heat sink.

6. The shelter of claim 2 which comprises:
   means to vent the accummulated solar energy from the insulation zone into the defined environment.

7. The shelter of claim 1 which comprises a buttress adjacent to one of said panels and means to secure the wall panels and the roof panels to said buttress.

8. The shelter of claim 1 which comprises means to seal the interface between adjacent edges of the wall and roof panels.

9. The shelter of claim 1 wherein at least one of said panels comprises a first frame and a second frame; the first and second frames spaced apart from another in parallel relatinship and secured to another by struts.

10. The shelter of claims 1 or 9 wherein the frames include exposed connectors and the panels are adapted to join one to the other via the connectors.

11. The shelter of claims 1 or 9 wherein the inner and outer skins each comprise vent means to provide for the flow of air through the panels.

12. The shelter of claim 1 wherein the film is STRETCH WRAP.

13. The shelter of claim 1 wherein the barrier film comprises a coating on at least one surface of the carrier film.

14. The shelter of claim 1 which includes means to introduce a fluid into said panel.

15. The shelter of claim 14 wherein the film is impermeable to the fluid disposed in the panel.

16. The shelter of claim 1 wherein the frame is comprised of tubular rods and which includes means to flow a fluid through said rods which rods are characterized by apperturs whereby the fluid may be discharged within said panel.

17. The shelter of claim 1 wherein the frame is comprised of tubular rods having apertures therein and which includes means to introduce a fluid into said rods whereby the fluid may be discharged into the defined environment.

18. The shelter of claim 17 wherein the fluid so introduced allows the panel to function as an infrared reflecting mirror whereby the shelter achieves a greenhouse effect.

19. The shelter of claim 1 wherein the carrier film is selected from the group consisting essentially of polyethylene, polypropylene, polyesters and biaxially oriented shrink films.

20. A shelter which comprises:
   a plurality of wall panels arrayed in side-by-side relationship, each of said wall panels having upper ends and lower ends;
   a plurality of roof panels joined to the upper ends of the wall panels and to one another, the wall and roof panels defining an enclosed environment;
   at least one of said panels comprising a frame, a film secured about the frame to form an outer skin and an inner skin which skins define an insulation zone therebetween; and at least one of said skins comprising a first carrier film and a first barrier film and a second carrier film and a second barrier film, said barrier films supported by said carrier films respectfully, which barrier films function as filters in reference to the transmission of solar energy and which barrier films are opposed to one another.

21. The shelter of claim 20 which includes means to maintain a substance between said carrier films which substance will act as a filter in reference to the transmission of solar energy.

22. The shelter of claim 21 wherein said coated films are impermeable to said substances.

* * * * *